US012587482B2

(12) United States Patent　　(10) Patent No.:　US 12,587,482 B2
Chen　　(45) Date of Patent:　Mar. 24, 2026

(54) DATA TRANSMISSION METHOD, DATA TRANSMISSION DEVICE, AND STORAGE MEDIUM

(71) Applicant: Beijing Xiaomi Mobile Software Co., Ltd., Beijing (CN)

(72) Inventor: Dong Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 135 days.

(21) Appl. No.: 18/579,588

(22) PCT Filed: Jul. 16, 2021

(86) PCT No.: PCT/CN2021/106728

§ 371 (c)(1),
(2) Date: Jan. 16, 2024

(87) PCT Pub. No.: WO2023/283927

PCT Pub. Date: Jan. 19, 2023

(65) Prior Publication Data

US 2024/0323127 A1　　Sep. 26, 2024

(51) Int. Cl.
*H04L 47/24*　　(2022.01)
*H04W 28/02*　　(2009.01)

(52) U.S. Cl.
CPC ......... *H04L 47/24* (2013.01); *H04W 28/0289* (2013.01)

(58) Field of Classification Search
CPC ............................ H04L 47/24; H04W 28/0289
See application file for complete search history.

(56) References Cited

U.S. PATENT DOCUMENTS

| 6,587,453 | B1 | 7/2003 | Romans et al. |
| 2014/0185451 | A1* | 7/2014 | Yip ......................... H04L 47/60 |
| | | | 370/236 |
| 2015/0009874 | A1 | 1/2015 | Edara et al. |

(Continued)

FOREIGN PATENT DOCUMENTS

| CN | 105051769 A | 11/2015 |
| CN | 107332909 A | 11/2017 |

(Continued)

OTHER PUBLICATIONS

Combined Chinese Office Action and Search Report issued Nov. 7, 2024 in Chinese Patent Application No. 202180002143.4 (with English translation), citing documents 1 and 15-17 therein, 14 pages.
International Search Report issued Apr. 20, 2022 in PCT/CN2021/106728, filed on Jul. 16, 2021, citing documents 1 & 15-16 therein, 4 pages (with English Translation).

(Continued)

*Primary Examiner* — Suraj M Joshi

(74) *Attorney, Agent, or Firm* — Oblon, McClelland, Maier & Neustadt, L.L.P.

(57)　　　　ABSTRACT

The present disclosure relates to a data transmission method, a data transmission device, and a storage medium. The data transmission method is characterized by being applied to a data generation end. The method includes: determining the number of Internet Protocol (IP) data packets, wherein the number of the IP data packets comprises a first number and a second number; and within a first data transmission period, transmitting a first type of data on the basis of the first number, and transmitting a second type of data on the basis of the second number.

14 Claims, 4 Drawing Sheets

(56)          References Cited

U.S. PATENT DOCUMENTS

| | | | |
|---|---|---|---|
| 2019/0068350 A1 | 2/2019 | Brown et al. |
| 2020/0099480 A1 | 3/2020 | Grövlen et al. |
| 2021/0083942 A1 | 3/2021 | Finkelstein |

FOREIGN PATENT DOCUMENTS

| | | | |
|---|---|---|---|
| CN | 108616449 A | 10/2018 |
| CN | 109428640 A | 3/2019 |
| CN | 112631978 A | 4/2021 |
| CN | 112839378 A | 4/2021 |
| CN | 112751644 A | 5/2021 |
| CN | 112804710 A | 5/2021 |
| CN | 113038437 A | 6/2021 |
| WO | WO-2017/000840 A1 | 1/2017 |
| WO | WO 2019/242755 A1 | 12/2019 |

OTHER PUBLICATIONS

Combined Chinese Office Action and Search Report issued Mar. 31, 2025, in corresponding Chinese Patent Application No. 202180002143.4 (with English Translation) citing documents 15 and 16 therein, 12 pages.

Combined Chinese Office Action and Search Report issued Jul. 11, 2025, in corresponding Chinese Patent Application No. 202180002143.4 (with English Translation) citing documents 17-20, 25 and 26 therein, 12 pages.

Guo Lei et al., "The Comparison of Tow HARQ Methods in Mobile Communication System", Communications Technology, No. 3, 2003, pp. 16-18.

Z. Shi, et al., "Packet Loss Control Using Tokens at the Network Edge", IEEE Latin America Transactions, vol. 10, No. 1, 2012, pp. 1391-1393.

* cited by examiner

S11
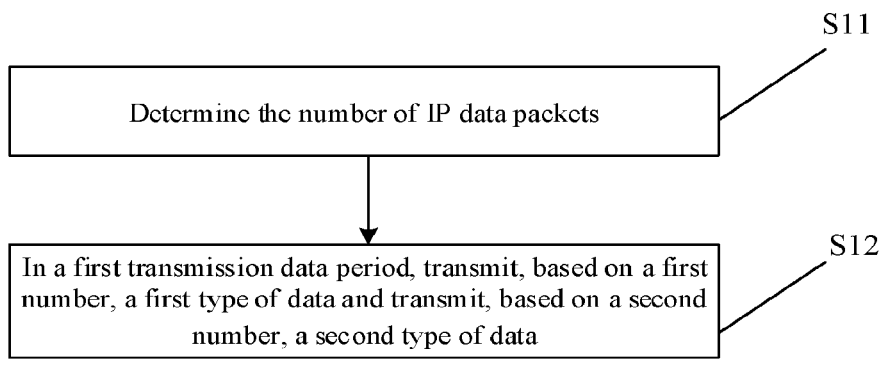
FIG. 3
S21
In response to a first number of IP data packets being all sent successfully within a first time, send a second type of data
FIG. 4
S31
In response to not all of a first number of IP data packets being successfully sent within a first time, send the first number of IP data packets based on a next transmission data period of a first transmission data period
FIG. 5
100
101                                    102
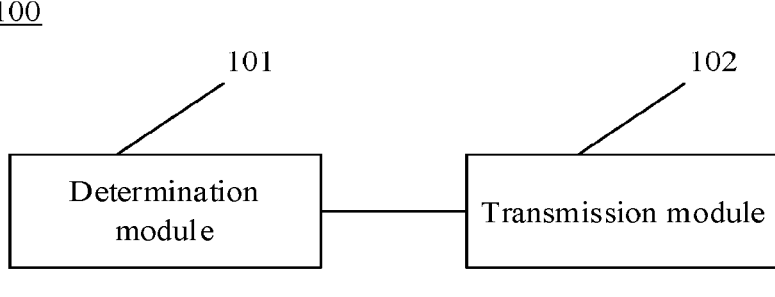
FIG. 6

DATA TRANSMISSION METHOD, DATA TRANSMISSION DEVICE, AND STORAGE MEDIUM

CROSS-REFERENCE TO RELATED APPLICATIONS

The present application is a U.S. National Stage of International Application No. PCT/CN2021/106728, filed on Jul. 16, 2021, the contents of which are incorporated herein by reference in their entireties for all purposes.

BACKGROUND

Technical Field

The present disclosure relates to the field of wireless communication technologies, and in particular to a method for transmitting data, an apparatus for transmitting data and a storage medium.

Description of the Related Art

In a wireless environment, Internet Protocol (IP) data packets may be subject to a problem that the IP data packets are discarded during transmission. For example, some IP data packets are lost due to transmission failure, or the IP data packets are invalid due to excessive transmission delay, etc.

When transmission data for services is large and requires a plurality of IP data packets for transmission, the plurality of IP data packets are required to arrive at a receiving end within a specified time, and if one IP data packet does not arrive within the specified time, the plurality of IP data packets will all be invalid. Alternatively, an IP data packet configured to transmit key data among the plurality of IP data packets is lost, and the remaining IP data packets that have reached the receiving end have to be discarded.

SUMMARY

The present disclosure provides a method for transmitting data, an apparatus for transmitting data and a storage medium.

According to a first aspect of embodiments of the present disclosure, there is provided a method for transmitting data, which is applied to a data generation end, and the method includes determining the number of Internet Protocol (IP) data packets, wherein the number of IP data packets includes a first number and a second number, and in a first transmission data period, transmitting, based on the first number, a first type of data and transmitting, based on the second number, a second type of data.

According to a second aspect of embodiments of the present disclosure, there is provided an apparatus for transmitting data, including a processor and a memory configured to store instructions executable by the processor. The processor is configured to execute the method for transmitting the data as described in the first aspect or any implementation of the first aspect.

According to a third aspect of embodiments of the present disclosure, there is provided a non-transitory computer-readable storage medium, wherein instructions in the storage medium, when executed by a processor of a mobile terminal, enable the mobile terminal to execute the method for transmitting the data as described in the first aspect or any implementation of the first aspect.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in and constitute a part of this specification, illustrate embodiments consistent with the present disclosure and together with the description serve to explain principles of the present disclosure.

FIG. 3 illustrates a flowchart of a method for transmitting data according to an embodiment of the present disclosure.

FIG. 4 illustrates a flowchart of another method for transmitting data according to an embodiment of the present disclosure.

FIG. 5 illustrates a flowchart of yet another method for transmitting data according to an embodiment of the present disclosure.

FIG. 6 illustrates a block diagram of an apparatus for transmitting data according to an embodiment of the present disclosure.

DETAILED DESCRIPTION OF THE PREFERRED EMBODIMENTS

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with some aspects of the present disclosure as recited in the appended claims.

Figure 1:
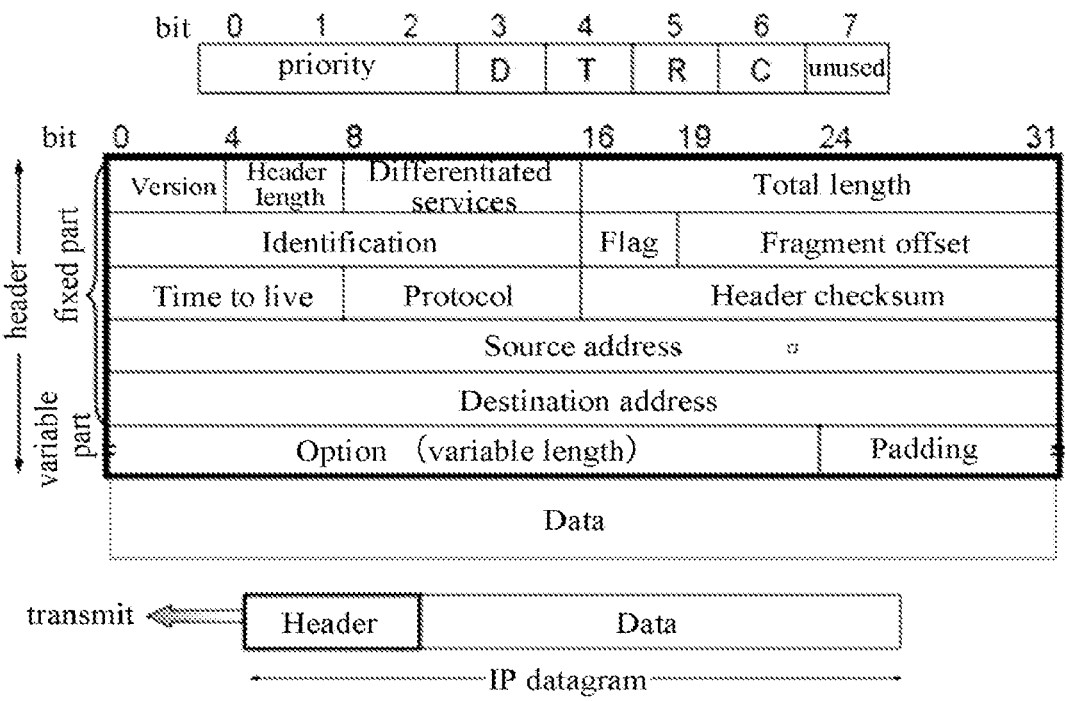
FIG. 1 illustrates a schematic diagram of an IP datagram format according to an embodiment of the present disclosure.

In the Internet field, an IP protocol is generally used in various data transmissions, and it may also be applied in the field of mobile communications. A protocol unit where the IP protocol controls transmission is called an IP datagram. The IP protocol shields differences between various physical subnets of a lower layer, and thus it can provide the IP datagram in a unified format to an upper layer. The IP datagram adopts a datagram packet transmission mode, and a service provided by the IP datagram is in a connectionless mode. A function that an IP data packet protocol has may be determined by a format of the IP datagram. For example, an IPv4 datagram consists of a header and data, where the data is data that the higher layer needs to transmit, and the header is control information added to correctly transmit the higher layer data. A first part of the header has a fixed length of 20 bytes and is required for all IP datagrams. Following the fixed part of the header is an optional field with a variable length. FIG. 1 illustrates a schematic diagram of an IP datagram format according to an embodiment of the present disclosure. As shown in FIG. 1, the fixed part includes: version, header length, differentiated services, total length, identification, flag, fragment offset, time to live, protocol, header checksum, source address and destination address.

Where, (1) Version: it occupies four bits, and refers to a version of the IP protocol. The IP protocol versions used by both communication parties must be consistent. The widely used IP protocol version number is 4 (i.e., IPv4).

(2) Header length: it occupies four bits, and the maximum decimal value that it can represent is 15. It should be noted that a unit of a number represented by this field is 32 bits (32 bits are equal to 4 bytes). Therefore, when the IP header length is 1111 (that is, 15 in decimal), the header length reaches 60 bytes. When a header length of an IP packet is not an integer multiple of 4 bytes, the last padding field must be used for padding. Therefore, the data part always starts at an integer multiple of 4 bytes, which is more convenient when the IP protocol is implemented. A disadvantage of limiting the header length to 60 bytes is that it may not be sufficient in some cases. But this is done in the hope that a user will minimize overhead. The most commonly used header length is 20 bytes (that is, the header length is 0101), and no options are used in this case.

(3) Differentiated services: it occupies 8 bits, and is used to obtain a better service. It may also be called type of service. This field is used when the differentiated services are used.

(4) Total length: it refers to a sum length of the header and the data in unit of bytes. The total length field is 16 bits, so the maximum length of the datagram is $2^16-1=65535$ bytes.

Each data link layer below the IP layer has its own frame format, which includes the maximum length of a data field in the frame format, which is called the Maximum Transfer Unit (MTU). When a datagram is packaged into a link layer frame, the total length (that is, the header plus the data part) of the datagram must not exceed a MTU value of the data link layer below it.

(5) Identification: it occupies 16 bits. An IP software maintains a counter in a memory. Each time a datagram is generated, the counter is incremented by 1 and this value is assigned to the identification field. But this "identification" is not a sequence number, because IP is a connectionless service, there is no problem of receiving datagrams in order.

When a datagram must be fragmented because its length exceeds the network's MTU, the value of this identification field is copied to identification fields of all datagrams. The same identification field value enables respective fragmented datagram fragments to be correctly reassembled into the original datagram.

(6) Flag: it occupies 3 bits, 2 of which are meaningful.

The lowest bit in the flag field is recorded as More Fragment (MF). MF=1 means that there will be a following "fragmented" datagram. MF=0 means that this is the last of several datagram fragments. The middle bit of the flag field is recorded as Don't Fragment (DF), which means "fragmentation is not allowed". Fragmentation is only allowed when DF=0.

(7) Fragment offset: it occupies 13 bits. The fragment offset indicates a relative position of a certain fragment in an original packet after a long packet is fragmented, and where this fragment begins relative to a start of the user data field. The fragment offset is in 8-byte offset units. That is, except for the last fragment, a length of each fragment must be an integer multiple of 8 bytes (64 bits).

(8) Time to live: it occupies 8 bits. The commonly used English abbreviation of the time to live field is TTL (Time To Live), which indicates a life span of the datagram in the network. This field is set by an origin that sends the datagram, with a purpose to prevent an undeliverable datagram from circulating around the Internet indefinitely to consume network resources in vain. An original design was to use seconds as the unit of TTL. Each time a datagram passes through a router, a period of time the datagram takes in the router is subtracted from the TTL. If the datagram takes less than 1 second at the router, the TTL value is decremented by 1. When the TTL value is 0, the datagram is discarded. A function of the TTL field was then changed to "hop limit" (but the name remained unchanged). The router decrements the TTL value by 1 before forwarding the datagram. If the TTL value is decreased to zero, the datagram is discarded and no longer forwarded. Therefore, the unit of TTL is no longer seconds, but the number of hops. The meaning of TTL is to indicate the maximum number of routers that the datagram can pass through in the network. Obviously, the maximum number of routers that the datagram can pass through in the network is 255. If an initial value of the TTL is set to 1, it means that the datagram can only be transferred in this LAN.

(9) Protocol: it occupies 8 bits. The protocol field indicates which protocol is used for data carried in the datagram, so that an IP layer of a destination host knows which processing process the data part should be handed over.

(10) Header checksum: it occupies 16 bits. This field only checks the header of the datagram, but not the data part. Since every time the datagram passes through the router, the router needs to recalculate the header checksum (including some fields, such as time to live, flag, fragment offset, etc., which may change). If the data part is not checked, the calculation workload can be reduced.

(11) Source address: it occupies 32 bits.

(12) Destination address: it occupies 32 bits.

Variable Part

The variable part of the IP header is an option field. The option field is used to support actions such as troubleshooting, measurement, and security. A length of this field is variable, from 1 byte to 40 bytes, depending on a selected item. Some option items require only 1 byte, which only includes a 1-byte option code. But there are also some options that require multiple bytes. These options are spliced one by one without separators in the middle. Finally, they are filled with the all-0 padding field to become an integer multiple of 4 bytes.

The purpose of adding the variable part of the header is to increase the function of the IP datagram, but it also makes the length of the header of the IP datagram variable, which increases the overhead of each router processing the datagram. The new IP version IPV6 makes the header length of the IP datagram fixed. These options are defined as follows:

(1) Security and Handling Restrictions (for military).

(2) Record Path (make each router record its IP address).

(3) Time Stamp (make each router record an IP address and a local time of each router through which the IP datagram passes).

(4) Loose Source Route (specify a series of IP addresses that a datagram must pass through).

(5) Strict Source Route (similar to the loose source route, but it requires that the datagram can only pass through specified addresses and cannot pass through other addresses).

In a wireless environment of communication technologies, there is a possibility of packet loss during a transmission process of an IP data packet. For example, in a data transmission from a network device to a terminal, not all IP data packets can reach the terminal during the data transmission. Some of the IP data packets are lost and cannot reach the terminal due to an excessive delay or invalid of the IP data packet.

For example, for real-time video services, after data for a frame of image on a screen is generated, a plurality of IP data packets are required for transmission, and the plurality of IP data packets need to reach a receiving end within a time when the image is displayed. If the plurality of IP data packets corresponding to the frame of image do not arrive at the receiving end within the display time, it is determined that the plurality of IP data packets are invalid because they cannot be displayed. Moreover, the IP data packets required for the frame of image include a key IP data packet, that is, if the frame of image is to be displayed, the key IP data packet must reach the receiving end. If the key IP data packet does not arrive at the receiving end, it is determined that the frame of image cannot be displayed, and other IP data packets need to be discarded, and these other IP data packets may be non-key IP data packets.

In some services, data transmission has a certain regularity. For example, for a video service, a fixed number of IP data packets may be used to transmit a frame of image. The fixed number of IP data packets may be N IP data packets, where N is a positive integer. Among these N IP data packets, a fixed number of key data packets are included, and the remaining number of IP data packets are non-key IP data packets. Based on this, the present disclosure provides a method for transmitting data. A data transmission period is determined based on a data transmission regularity, and service data with regularity is periodically transmitted. The data transmission efficiency can be improved.

Figure 2:
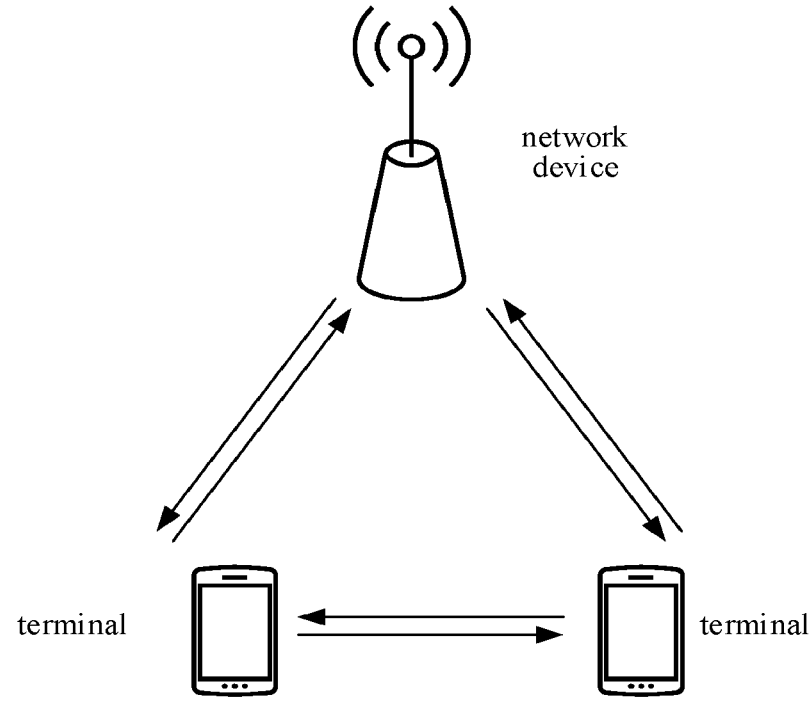
FIG. 2 illustrates a diagram of a communication system architecture between a network device and a terminal according to an embodiment of the present disclosure.

FIG. 2 illustrates a diagram of a communication system architecture of a network device and a terminal according to an embodiment of the present disclosure. The method provided by the present disclosure may be applied to the communication system architecture diagram shown in FIG. 2. As shown in FIG. 2, a network-side device may send a signaling based on the architecture shown in FIG. 2.

It can be understood that the communication system of the network device and the terminal shown in FIG. 2 is merely a schematic illustration, and the wireless communication system may further include other network devices, such as a core network device, a wireless relay device, and a wireless backhaul device, which are not shown in FIG. 2. Embodiments of the present disclosure do not limit the number of network devices and the number of terminals included in the wireless communication system.

It can be further understood that the wireless communication system of embodiments of the present disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to the capacity, speed, delay and other factors of different networks, the networks may be divided into the 2G (generation) network, the 3G network, the 4G network or the future evolution network, such as the 5G network. The 5G network may also be referred to as a new radio (NR) network. For convenience of description, the present disclosure may sometimes refer to a wireless communication network simply as a network.

Further, the network device involved in the present disclosure may also be referred to as a radio access network device. The radio access network device may be: a base station, an evolved node B, a home base station, an access point (AP) in a wireless fidelity (WIFI) system, a wireless relay node, a wireless backhaul node, a transmission point (TP) or a transmission and reception point (TRP), etc., may also be a gNB in the NR system, or may also be a component or part of devices that constitute the base station. When the wireless communication system is a vehicle-to-everything (V2X) communication system, the network device may also be a vehicle-mounted device. It can be understood that in embodiments of the present disclosure, the specific technologies and specific device forms adopted by the network device are not limited.

Further, the terminal involved in the present disclosure may also be referred to as a terminal device, user equipment (UE), a mobile station (MS), a mobile terminal (MT), etc., and is a device that provides voice and/or data connectivity to a user. For example, the terminal may be a handheld device with a wireless connectivity function, a vehicle-mounted device, etc. At present, some examples of terminals are: mobile phones, pocket personal computers (PPCs), palm computers, personal digital assistants (PDAs), notebook computers, tablet computers, wearable devices, or vehicle-mounted devices, etc. In addition, when the wireless communication system is the vehicle-to-everything (V2X) communication system, the terminal device may also be a vehicle-mounted device. It can be understood that embodiments of the present disclosure do not limit the specific technologies and specific device forms adopted by the terminal.

FIG. 3 illustrates a flowchart of a method for transmitting data according to an embodiment of the present disclosure. As shown in FIG. 3, the method for transmitting the data is applied in a data sending end (which may also called a data generation end) and includes steps S11 to S12.

In the step S11, the number of IP data packets is determined.

The number of IP data packets includes a first number and a second number.

In the step S12, within a first transmission data period, a first type of data is transmitted based on the first number, and a second type of data is transmitted based on the second number.

In embodiments of the present disclosure, the number of IP data packets included in one transmission period is determined, and the number of IP data packets is fixed. For example, it is determined that N IP data packets are included in one transmission period, and among the N IP data packets, M IP data packets configured to transmit the first type of data are determined, the number of the M IP data packets may also be fixed. Among the N IP data packets, except for the M IP data packets configured to transmit the first type of data, the remaining IP data packets are IP data packets configured to transmit the second type of data, that is, the second number of IP data packets.

The data sending end fixes, in the N IP data packets, data that needs to be transmitted, and fixes, in the N IP data packets, the data to be transmitted, in a manner that the first type of data is placed in the first number of IP data packets, and the second type of data is placed in the second number of IP data packets. In the first transmission data period, the first type of data is transmitted based on the first number, and the second type of data is transmitted based on the second number.

Through the method for transmitting the data provided by embodiments of the present disclosure, different types of data are placed in corresponding IP data packets, and the IP data packets are sent based on the transmission data period. Placing, in IP data packets that are at different positions, the different types of data enables purposefully sending the IP data packets, which can improve the efficiency of sending the IP data packets.

In some embodiments of the present disclosure, an importance of the first type of data is greater than an importance of the second type of data. That is, the data to be transmitted is divided into relatively important first type of data and relatively unimportant second type of data according to the importance.

In some embodiments of the present disclosure, the data to be transmitted is placed in a fixed number of IP data packets, and according to a data type, relatively important data is placed in the first number of IP data packets, and relatively unimportant data is placed in the second number of IP data packets. The first number of IP data packets precede the second number of IP data packets within one transmission data period, and accordingly, a sending order of IP data packets corresponding to the first number is before a sending order of IP data packets corresponding to the second number.

FIG. 4 illustrates a flowchart of a method for transmitting data according to an embodiment of the present disclosure. As shown in FIG. 4, the method for transmitting the data is applied in a data sending end and includes step S21.

In the step S21, in response to all the first number of IP data packets being successfully sent within a first time, the second type of data is sent.

The first time is the time for sending the first type of data.

In embodiments of the present disclosure, the data sending end sends, based on the first transmission data period, a data packet belonging to the first transmission data period, and first starts to send the first number of IP data packets. After all the first number of IP data packets are successfully sent, that is, after all the first type of data is successfully sent, the second number of IP data packets are determined to be sent.

FIG. 5 illustrates a flowchart of a method for transmitting data according to an embodiment of the present disclosure. As shown in FIG. 5, the method for transmitting the data is applied in a data sending end and includes step S31.

In the step S31, in response to not all the first number of IP data packets being successfully sent within the first time, the first number of IP data packets are sent based on a next transmission data period of the first transmission data period.

In embodiments of the present disclosure, in a case that the data sending end sends a fixed number of IP data packets in an order of first sending the first number of IP data packets and then sending the second number of IP data packets during the first data transmission period, if not all the first type of data is successfully sent in the required time within the first transmission data period, it is determined to stop sending the second type of data, that is, to stop sending the second number of IP data packets, and based on the next transmission data period, it is started to send the first number of IP data packets.

For example, taking the video service as an example, a frame of image of the video service is fixed to be transmitted within one transmission data period, and one transmission data period includes N IP data packets. The relatively important data (i.e., the first type of data) of the frame of image is placed in the first number of IP data packets, where the first number may be M, and the relatively unimportant data (i.e., the second type of data) is placed in the second number of IP data packets, the second number is N-M. The first N IP data packets are first sent, and if the first N IP data packets are successfully sent within the required first time, the sequent N-M IP data packets of the frame of image will continue to be sent. If not all of the first N IP data packets are sent successfully within the required first time, the sending of the sequent N-M IP data packets of the frame of image will be given up, and IP data packets of the next frame of image will start to be sent based on the transmission data period.

Through the method for transmitting the data provided by the present disclosure, when not all the first type of data is successfully sent, the sending of the sequent IP data packets in the current transmission data period is abandoned, which can reduce the waste of IP data packets and improve the transmission efficiency of IP data packets.

In some embodiments of the present disclosure, the IP data packet includes an identification configured to indicate a type of data transmitted. That is, the data sending end may identify the first number of IP data packets and the second number of IP data packets to identify an IP data packet of a transmission data type. As mentioned above, one transmission data period includes N IP data packets, and the first number is M. Then, the first number of IP data packets, that is, M IP data packets, can be respectively identified as $N*X$, $N*X+1$, $N*X+2, \ldots, N*X+M-1$. The second number of IP data packets, that is, N-M IP data packets, are respectively identified as $N*X+M$, $N*X+M+1$, $N*X+M+2, \ldots, N*X+N-1$. X represents an order of transmitted data. For example, if X is 1, then a first frame of image of the video service is transmitted in this transmission data period, and if X is 2, then a second frame of image of the video service is transmitted in this transmission data period, etc.

When all IP data packets identified as $N*X$, $N*X+1$, $N*X+2, \ldots, N*X+M-1$ are successfully sent, it is determined to send IP data packets identified as $N*X+M$, $N*X+M+1$, $N*X+M+2$, $N*X+N-1$.

In some embodiments of the present disclosure, the number of IP data packets, the first number and the second number are determined based on a protocol or a predefined rule.

In embodiments of the present disclosure, the above embodiments may be applied to a service with a strong regularity such as the video service, and may also be applied to other services.

In embodiments of the present disclosure, the data sending end may be a terminal or a network device, which is not specifically limited here.

Based on the same concept, embodiments of the present disclosure further provide an apparatus for transmitting data.

It can be understood that, in order to implement the above-mentioned functions, the apparatus for transmitting the data provided by embodiments of the present disclosure includes corresponding hardware structures and/or software modules for executing respective functions. In combination with units and algorithm steps of various examples disclosed in embodiments of the present disclosure, embodiments of the present disclosure may be implemented by in a form of hardware or a combination of the hardware and computer software. Whether a certain function is implemented in the fashion of hardware or in the fashion that the computer software drives the hardware depends on a particular application and design constraints of the technical solution. A person skilled in the art may implement the described functions with different methods for each particular application, but such an implementation shall not be regarded as going beyond the scope of the technical solution according to embodiments of the present disclosure.

FIG. 6 illustrates a block diagram of an apparatus for transmitting data according to an embodiment of the present disclosure. Referring to FIG. 6, the apparatus 1000 for transmitting the data is applied to a data generation end and includes a determination module 101 and a transmission module 102.

The determination module 101 is configured to determine the number of Internet Protocol (IP) data packets, wherein the number of IP data packets includes a first number and a second number. The transmission module 102 is configured to, in a first transmission data period, transmit, based on the first number, a first type of data and transmit, based on the second number, a second type of data.

In an embodiment of the present disclosure, an importance of the first type of data is greater than an importance of the second type of data.

In an embodiment of the present disclosure, a sending order of an IP data packet corresponding to the first number is before a sending order of an IP data packet corresponding to the second number.

In an embodiment of the present disclosure, the transmission module 102 is configured to, in response to the first number of IP data packets being all sent successfully within a first time, send the second type of data, and the first time is a time for sending the first type of data.

In an embodiment of the present disclosure, the transmission module 102 is further configured to, in response to not all of the first number of IP data packets being successfully sent within the first time, send the first number of IP data packets based on a next transmission data period of the first transmission data period.

In an embodiment of the present disclosure, the IP data packet includes an identification, and the identification is configured to indicate a type of data transmitted.

In an embodiment of the present disclosure, the number of IP data packets, the first number and the second number are determined based on a protocol or a predefined rule.

Regarding the apparatus in the foregoing embodiments, a specific manner in which each module executes operations has been described in detail in embodiments related to the method, and will not be described in detail here.

Figure 7:
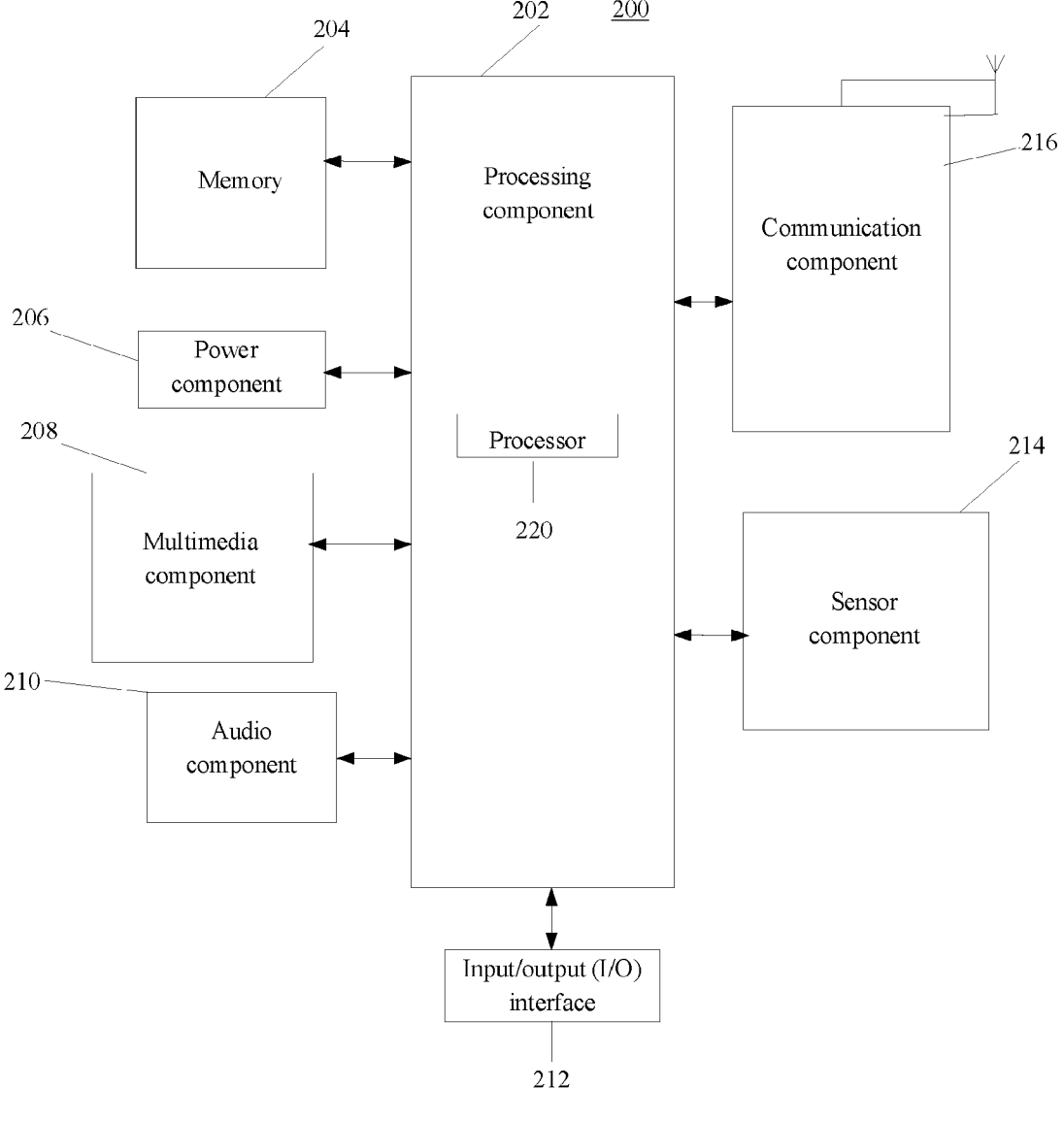
FIG. 7 illustrates a block diagram of a device for transmitting data according to an embodiment of the present disclosure.

FIG. 7 illustrates a block diagram of a device 200 for transmitting data according to an embodiment of the present disclosure. For example, the device 200 may be a mobile phone, a computer, a digital broadcast terminal, a messaging apparatus, a gaming console, a tablet, a medical apparatus, exercise equipment, a personal digital assistant, etc.

Referring to FIG. 7, the device 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the device 200, such as the operations associated with display, telephone calls, data communications, camera operations, and recording operations. The processing component 202 may include one or more processors 220 to execute instructions to perform all or part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, etc. The memory 204 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the device 200. The power component 206 may include a power management system, one or more power sources, and any other components associated with the generation, management, and distribution of power in the device 200.

The multimedia component 208 includes a screen providing an output interface between the device 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and the rear camera may receive an external multimedia datum while the device 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone (MIC) configured to receive an external audio signal when the device 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the device 200. For instance, the sensor component 214 may detect an open/closed status of the device 200, relative positioning of components, e.g., the display and the keypad, of the device 200, a change in position of the device 200 or a component of the device 200, a presence or absence of user contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the device 200 and other devices. The device 200 may access a wireless network based on a communication standard, such as WiFi, 2G, or 3G, or a combination thereof. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 200 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In an embodiment, there is also provided a non-transitory computer readable storage medium including instructions, such as the memory 204 including instructions, the above instructions may be executed by the processor 220 in the device 200 for performing the above-described methods. For example, the non-transitory computer-readable storage medium may be a ROM, a Random Access Memory (RAM), a CD-ROM, a magnetic tape, a floppy disc, an optical data storage device, and the like.

Figure 8:
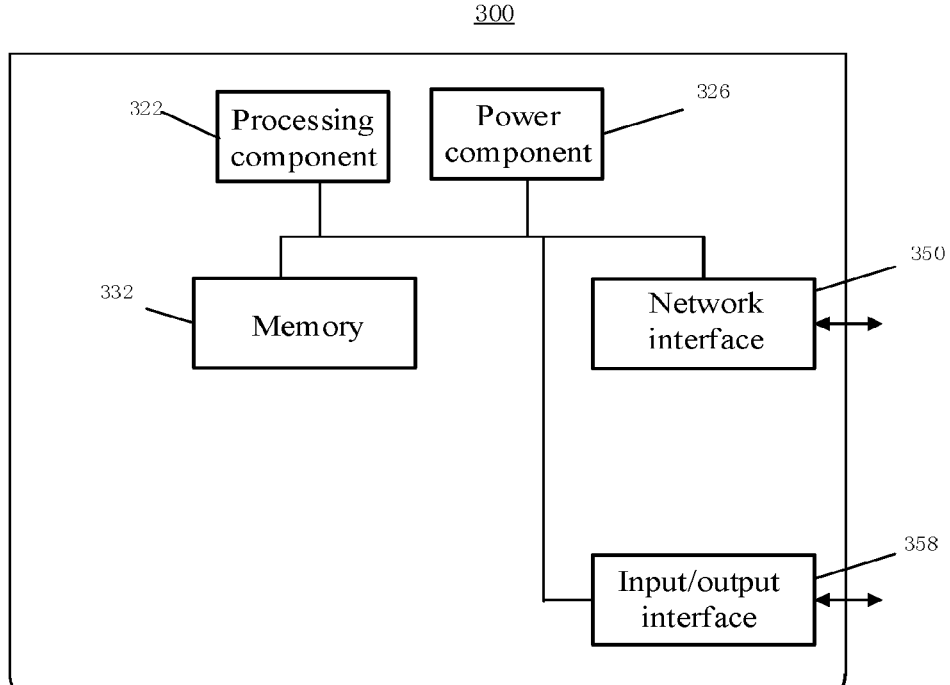
FIG. 8 illustrates a block diagram of another device for transmitting data according to an embodiment of the present disclosure.

FIG. 8 illustrates a block diagram of a device 300 for transmitting data according to an embodiment of the present disclosure. For example, the device 300 may be provided as a server. Referring to FIG. 8, the device 300 includes a processing component 322, which further includes one or more processors and a memory resource represented by a memory 332 for storing instructions executable by the processing component 322, such as an application program. The application program stored in the memory 332 may include one or more modules, each corresponding to a set of instructions. In addition, the processing component 322 is configured to execute the instructions to execute the aforementioned method.

The device 300 may also include: a power component 326 configured to perform power management of the device 300, a wired or wireless network interface 350 configured to connect the device 300 to the network, and an input/output (I/O) interface 358. The device 300 may operate an operating system stored in the memory 332, such as Windows Server™, Mac OS X™, Unix™, Linux™, FreeBSD™, or the like.

The present disclosure provides a method for transmitting data, an apparatus for transmitting data and a storage medium.

According to a first aspect of embodiments of the present disclosure, there is provided a method for transmitting data, which is applied to a data generation end, and the method includes:

determining the number of Internet Protocol (IP) data packets, wherein the number of IP data packets includes a first number and a second number; and in a first transmission data period, transmitting, based on the first number, a first type of data and transmitting, based on the second number, a second type of data.

In an implementation of the present disclosure, an importance of the first type of data is greater than an importance of the second type of data.

In an implementation of the present disclosure, a sending order of an IP data packet corresponding to the first number is before a sending order of an IP data packet corresponding to the second number.

In an implementation of the present disclosure, the transmitting, based on the second number, the second type of data includes:

in response to the first number of IP data packets being all sent successfully within a first time, sending the second type of data, wherein the first time is the time for sending the first type of data.

In an implementation of the present disclosure, the method further includes:

in response to not all of the first number of IP data packets being successfully sent within the first time, sending the first number of IP data packets based on a next transmission data period of the first transmission data period.

In an implementation of the present disclosure, the IP data packet includes an identification, and the identification is configured to indicate a type of data transmitted.

In an implementation of the present disclosure, the number of IP data packets, the first number and the second number are determined based on a protocol or a predefined rule.

According to a second aspect of embodiments of the present disclosure, there is provided an apparatus for transmitting data, which is applied to a data generation end, and the apparatus includes:

a determination module, configured to determine the number of Internet Protocol (IP) data packets, wherein the number of IP data packets includes a first number and a second number; and a transmission module, configured to, in a first transmission data period, transmit, based on the first number, a first type of data and transmit, based on the second number, a second type of data.

In an implementation of the present disclosure, an importance of the first type of data is greater than an importance of the second type of data.

In an implementation of the present disclosure, a sending order of an IP data packet corresponding to the first number is before a sending order of an IP data packet corresponding to the second number.

In an implementation of the present disclosure, the transmission module is configured to:

in response to the first number of IP data packets being all sent successfully within a first time, send the second type of data, wherein the first time is a time for sending the first type of data.

In an implementation of the present disclosure, the transmission module is further configured to:

in response to not all of the first number of IP data packets being successfully sent within the first time, send the first number of IP data packets based on a next transmission data period of the first transmission data period.

In an implementation of the present disclosure, the IP data packet includes an identification, and the identification is configured to indicate a type of data transmitted.

In an implementation of the present disclosure, the number of IP data packets, the first number and the second number are determined based on a protocol or a predefined rule.

According to a third aspect of embodiments of the present disclosure, there is provided an apparatus for transmitting data, including:

a processor; and a memory configured to store instructions executable by the processor; wherein the processor is configured to execute the method for transmitting the data as described in the first aspect or any implementation of the first aspect.

According to a fourth aspect of embodiments of the present disclosure, there is provided a non-transitory computer-readable storage medium, wherein instructions in the storage medium, when executed by a processor of a mobile terminal, enable the mobile terminal to execute the method for transmitting the data as described in the first aspect or any implementation of the first aspect.

The technical solutions provided by embodiments of the present disclosure may include the following beneficial effects: through the present disclosure, a fixed period can be determined based on data transmission, data to be transmitted is periodically sent, the data to be transmitted is classified and placed in a respective IP data packet, and the IP data packet is periodically sent based on the transmission data period. Periodically sending the IP data packet can transmit a data stream by a regular transmission band, which can improve the efficiency of sending the IP data packet while ensuring data continuity.

It should be further understood that the term "a plurality of" or "multiple" in the present disclosure refers to two or more than two, and other quantifiers are similar. The term "and/or" describes an association relationship between associated objects, and represents that there may exist three relationships. For example, A and/or B may represent three conditions in which A independently exists, A and B both exist and B independently exists. The character "/" generally represents that the associated objects form an "or" relationship. The singular forms "a", "the" and "said" are intended to include the plural forms as well, unless the context clearly indicates otherwise.

It should be further understood that, although the terms first, second, etc. may be configured to describe various information, such information should not be limited to these terms. These terms are only configured to distinguish the same type of information from each other, and do not imply a specific order or importance. In fact, expressions such as "first" and "second" can be used interchangeably For example, without departing from the scope of the present disclosure, the first information may also be referred to as the second information, and similarly, the second information may also be referred to as the first information.

It can be further understood that although the operations in embodiments of the present disclosure are described in a specific order in the drawings, they should not be understood as requiring that the operations should be performed in the specific order shown or in a serial order, or that perform all the operations shown to get the desired result. In certain environments, multitasking and parallel processing may be advantageous.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting data, performed by a data generation end, and comprising:

determining a number of Internet Protocol (IP) data packets, wherein the number of IP data packets comprises a first number and a second number; and in a first transmission data period, transmitting, based on the first number, a first type of data and transmitting, based on the second number, a second type of data, wherein the transmitting, based on the second number, the second type of data comprises:

in response to the first number of IP data packets being all sent successfully within a first time, sending the second type of data, or in response to not all of the first number of IP data packets being successfully sent within the first time, sending the first number of IP data packets based on a next transmission data period of the first transmission data period, wherein the first time is a time for sending the first type of data.

2. The method for transmitting the data according to claim 1, wherein an importance of the first type of data is greater than an importance of the second type of data.

3. The method for transmitting the data according to claim 2, wherein a sending order of an IP data packet corresponding to the first number is before a sending order of an IP data packet corresponding to the second number.

4. The method for transmitting the data according to claim 1, wherein the IP data packet comprises an identification configured to indicate a type of data transmitted.

5. The method for transmitting the data according to claim 1, wherein the number of IP data packets, the first number and the second number are determined based on a protocol or a predefined rule.

6. An apparatus for transmitting data, comprising:

a processor; and a memory configured to store instructions executable by the processor;

wherein the processor is configured to:

determine a number of Internet Protocol (IP) data packets, wherein the number of IP data packets comprises a first number and a second number; and in a first transmission data period, transmit, based on the first number, a first type of data and transmit, based on the second number, a second type of data, wherein the processor is further configured to:

in response to the first number of IP data packets being all sent successfully within a first time, send the second type of data, or in response to not all of the first number of IP data packets being successfully sent within the first time, send the first number of IP data packets based on a next transmission data period of the first transmission data period, wherein the first time is a time for sending the first type of data.

7. The apparatus according to claim 6, wherein an importance of the first type of data is greater than an importance of the second type of data.

8. The apparatus according to claim 7, wherein a sending order of an IP data packet corresponding to the first number is before a sending order of an IP data packet corresponding to the second number.

9. The apparatus according to claim 6, wherein the IP data packet comprises an identification configured to indicate a type of data transmitted.

10. The apparatus according to claim 6, wherein the number of IP data packets, the first number and the second number are determined based on a protocol or a predefined rule.

11. A non-transitory computer-readable storage medium, wherein instructions in the storage medium, when executed by a processor of a mobile terminal, enable the mobile terminal to:

determine a number of Internet Protocol (IP) data packets, wherein the number of IP data packets comprises a first number and a second number; and in a first transmission data period, transmit, based on the first number, a first type of data and transmit, based on the second number, a second type of data, wherein the instructions in the storage medium, when executed by the processor of the mobile terminal, further enable the mobile terminal to:

in response to the first number of IP data packets being all sent successfully within a first time, send the second type of data, or in response to not all of the first number of IP data packets being successfully sent within the first time, send the first number of IP data packets based on a next transmission data period of the first transmission data period, wherein the first time is a time for sending the first type of data.

12. The non-transitory computer-readable storage medium according to claim 11, wherein an importance of the first type of data is greater than an importance of the second type of data.

13. The non-transitory computer-readable storage medium according to claim 12, wherein a sending order of an IP data packet corresponding to the first number is before a sending order of an IP data packet corresponding to the second number.

14. The non-transitory computer-readable storage medium according to claim 11, wherein the IP data packet comprises an identification configured to indicate a type of data transmitted.

* * * * *